United States Patent
Cosenza

[15] 3,702,628
[45] Nov. 14, 1972

[54] LOCK NUT MEMBER
[72] Inventor: Frank J. Cosenza, Palos Verdes Pensiula, Calif.
[73] Assignee: Tridair Industries, Redondo Beach, Calif.
[22] Filed: Nov. 27, 1970
[21] Appl. No.: 93,421

Related U.S. Application Data
[63] Continuation of Ser. No. 696,367, Jan. 8, 1968, abandoned.

[52] U.S. Cl. .............................................151/21 B
[51] Int. Cl............................................F16b 39/286
[58] Field of Search.....151/21 R, 21 B, 21 C, 30, 15; 85/32 V

[56] References Cited

UNITED STATES PATENTS

| | | | |
|---|---|---|---|
| 118,238 | 8/1871 | Harvey | 151/21 B |
| 788,532 | 5/1905 | Higgin | 85/32 V |
| 993,371 | 5/1911 | Hines | 151/21 B |
| 2,314,509 | 3/1943 | Olson | 85/32 V |
| 2,393,520 | 1/1946 | Crowther | 151/21 R |

FOREIGN PATENTS OR APPLICATIONS

| | | | |
|---|---|---|---|
| 4,597 | 4/1886 | Great Britain | 151/21 B |
| 810,417 | 12/1936 | France | 151/21 B |

*Primary Examiner*—Marion Parsons, Jr.
*Attorney*—Arthur W. Fuzak and Thomas A. Seeman

[57] ABSTRACT

This disclosure describes a lock nut member including a body portion having an opening extending therethrough and a plurality of resilient locking segments joined to the body portion and extending generally axially thereof to define an extension of the opening. The interior surfaces of the locking segments are threaded to receive an externally threaded member. When the externally threaded member is received within the locking segments, the locking segments firmly grip the externally threaded member and are deflected radially outwardly. The locking segments are constructed so that they will deflect in a manner approaching the deflection of a flat beam.

1 Claim, 9 Drawing Figures

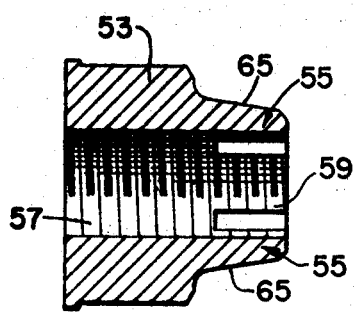
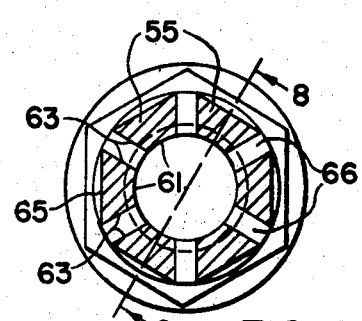
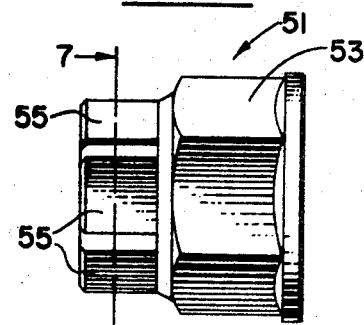
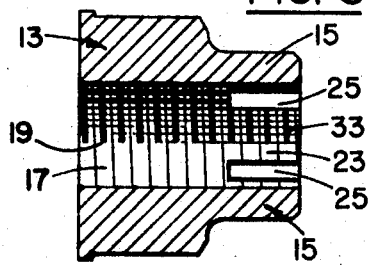
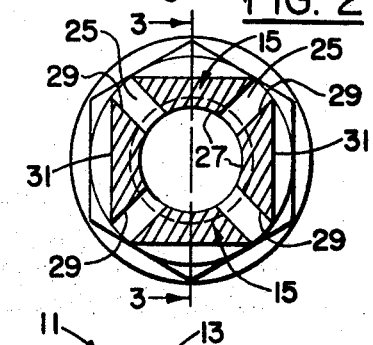
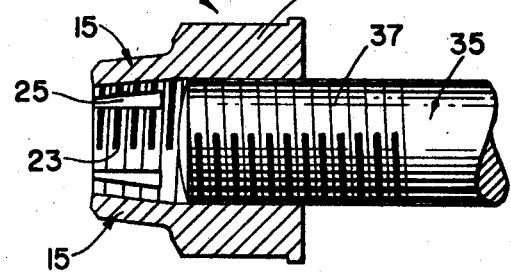
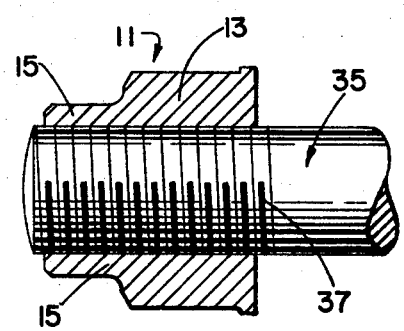
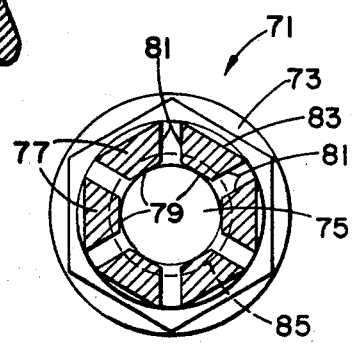
INVENTOR:
FRANK J. COSENZA

LOCK NUT MEMBER

This application is a continuation of application Ser. No. 696,367, filed Jan. 8, 1968 and now abandoned.

BACKGROUND OF THE INVENTION

Threaded fasteners, although relatively simple and inexpensive, are subject to loosening particularly when the fastener is subjected to vibration. To prevent the fastener from releasing, it is common practice to utilize a lock nut. One popular form of lock nut includes a body portion having an opening therein and a plurality of locking segments extending axially of the body portion to define an extension of the opening in the body portion. The locking segments are spaced circumferentially and are at least somewhat resilient so that when an externally threaded member such as a screw is placed in the extension of the opening, the locking segments will firmly grip the externally threaded member and frictionally retain it against rotation relative to the nut. The locking segments are arranged to provide an extension of the opening which is smaller in diameter than the diameter of the screw so that such frictional gripping action will occur.

When the screw is turned into the extension of the opening, the screw forces or deflects the relatively resilient locking segments radially outwardly. Thus, each time the lock nut is used, the locking segments are deflected outwardly when the nut is being tightened on the screw and allowed to spring back inwardly upon removal of the screw. Thus, the locking segments are flexed with each usage of the lock nut, and after flexing of the locking segments for a relatively few number of times, the locking segments no longer grip the screw with sufficient force to retain the screw against rotation relative to the nut. Thus, the locking segments of prior art lock nuts fail to produce the necessary gripping force after being used only a few times.

Still another disadvantage of lock nuts of this type is that the locking feature fails at relatively high temperatures. As is well known, the allowable stress in a member diminishes with increasing temperature, and it has been found that with prior art lock nuts, the stress in the locking segment oftentimes exceeds the allowable stress when the fastener is subjected to elevated temperatures. When this occurs the gripping capability of the lock nut is lost.

SUMMARY OF THE INVENTION

The present invention provides an improved lock nut member, which may be a nut or nutplate, and in which the locking segments can be flexed through many more cycles than was possible with prior art lock nuts of this type. Thus, the lock nut of this invention can be reused up to 10 to 20 times more than prior art lock nuts of this type. In addition, the lock nut of this invention retains its locking characteristics even at elevated temperatures where prior art lock nuts failed.

The present invention teaches that these advantageous results can be accomplished, in substantial part, by constructing the locking segments in such a manner as to cause them to deflect radially outwardly under the influence of the screw in a manner similar to the deflection of a flat beam. The locking segments of prior art lock nuts are configured so that each of the locking segments deflects like a curved beam. The problem with curved beam deflection in a lock nut is that a curved beam bends or deflects at one relatively small region thereon whereas a flat beam tends to deflect more evenly throughout the full length thereof. The result is that the curved beam is highly stressed at the area where bending occurs and is insignificantly stressed at other regions along the length of the beam. By way of contrast, the stress in the flat beam is spread fairly evenly throughout the full length of the beam. Thus, a flat beam type of deflection for the locking segments prevents concentration of stress at any one region along the length of the locking segment. As the maximum stress in the locking segment is reduced, it can be flexed through many more cycles and the allowable stress can be lowered significantly through temperature elevation without having the stress within the locking segment exceed the allowable stress.

More particularly, the outer surfaces of locking segments of prior art lock nuts are often curved or composed of several intersecting flat regions and this causes the locking segments to deflect in curved beam fashion. With the present invention, the outer surface of each of the locking segments is in the form of a single flat plane and this causes the locking segment to deflect in a manner approaching flat beam deflection.

As the force applied by the screw on the locking segments is applied radially outwardly, it is important that the locking segments react as a flat beam to forces applied in the radial direction. To this end the outer surface is preferably flat and perpendicular to an axially extending plane drawn through a central region of the segment and the axis of the opening through the nut. The flat beam deflection characteristic is more nearly approached if the inner surface of each of the locking segments which contacts the screw does not have a large circumferential dimension. Thus, a locking segment which extends, for example, for 180° around the screw would not be preferred because the inner surface would represent a substantial curve and tend to cause curved beam deflection.

To further assure deflection of the flat beam type, each of the locking segments is preferably substantially symmetrical in radial cross section. To further give the locking segment the deflection characteristics of a flat beam, the area of the inner surface of each of the locking segments intermediate the grooves defining the threads, may be made substantially flat. Finally, by minimizing the radial dimension of the slot between adjacent locking segments, each locking segment has a maximum cross sectional area for absorbing the force of deflection applied thereto by the screw. Slot width is minimized when the lateral surfaces of the locking segments extend generally radially.

Although constructing the locking segments for flat beam deflection provides a significant improvement in the elimination of stress concentration and the reduction of the maximum stress within the locking segment, the present invention also teaches that further evening of the stress can be provided by tapering the locking segments in axial cross section so that the locking segments become thinner as they extend away from the body portion. Theoretically a flat beam having the appropriate taper will have equal stress at longitudinally spaced points therealong.

The invention, both as to its organization and method of operation together with further features and advantages thereof may best be understood by reference to the following description taken in connection with the accompanying illustrative drawing.

BRIEF DESCRIPTION OF THE DRAWING

FIG. 1 is a side elevational view of a lock nut member constructed in accordance with the teachings of this invention.

FIG. 2 is a sectional view taken along line 2—2 of FIG. 1.

FIG. 3 is a sectional view taken along line 3—3 of FIG. 2.

FIGS. 4 and 5 are sectional views similar to FIG. 3 showing how the lock nut member cooperates with a screw to prevent relative rotation therebetween.

FIG. 6 is a side elevational view illustrating a second form of lock nut member.

FIG. 7 is a sectional view taken along line 7—7 of FIG. 6.

FIG. 8 is a sectional view taken along line 8—8 of FIG. 7.

FIG. 9 is a sectional view similar to FIG. 7 illustrating a third form of lock nut member.

DESCRIPTION OF THE PREFERRED EMBODIMENTS

Referring to the drawings and in particular to FIGS. 1-3 thereof, reference numeral 11 designates a lock nut member in the form of a lock nut constructed in accordance with the teachings of this invention. The lock nut 11 is integrally constructed of metal, although other materials may be used. The lock nut 11 includes a nondeflectible body portion 13 and four identical generally axially extending locking segments 15 integrally joined to the body portion. The body portion 13 has an axial opening 17 (FIG. 3) extending therethrough and the internal surface defining such opening has screw threads 19. The body portion 13 preferably has wrench flats 21 on the exterior surface thereof.

The locking segments 15 extend generally axially outwardly from the body portion 13 and define an axial extension 23 of the opening 17. The adjacent locking segments 15 are spaced slightly circumferentially to form axially extending slots 25 therebetween.

Each of the locking segments 15 includes an inner surface 27 (FIG. 2), a pair of radially extending planar lateral surfaces 29, and a flat outer surface 31 extending between and joining the lateral surfaces. The outer surface 31 is perpendicular to a plane containing the axis of the opening extension 23 and extending through a central portion of the segment 15. Each of the segments 15 is preferably symmetrical in radial cross section and the lateral surfaces 29 are preferably planar. Similarly, the outer surface 31 is in the form of a single plane. The inner surface 27 is provided with screw threads 33 and is slightly rounded as shown in FIG. 2. However, the circumferential extent of the surface 27 of each of the segments 15 is limited so that this roundness will not have any appreciable effect on the deflecting characteristics of the segment. Each of the segments 15 in an unstressed condition extends radially inwardly slightly as it extends away from the body portion 13 as shown in FIGS. 3 and 4 so that the diameter of the extension 23 is less than the diameter of the opening 17.

In use of the lock nut 11 a threaded member which may be in the form of a screw 35 having external threads 37 thereon and the nut 13 are relatively rotated to threadedly secure the screw 35 into the opening 17 of the body portion 13 as shown in FIG. 4. By continuing the relative rotation of the lock nut 11 and the screw 35, the threads 37 of the screw will be forced into the opening extension 23 formed by the segments 15 to the position shown in FIG. 5. As the segments 15 normally protrude slightly radially inwardly, movement of the screw 35 to the position shown in FIG. 5 will cause the segments 15 to tightly frictionally grip the threads 37 of the screw to prevent relatively counterrotation between the screw and lock nut. In addition, the screw 35 will deflect the segments 15 radially outwardly generally in cantilever fashion substantially as shown in FIG. 5. Because of the configuration of the segments 15, each of them deflects substantially in the same fashion as a flat beam. Accordingly, the entire length of the segment 15 undergoes some deflection and the maximum stress within the segments is held to a minimum.

FIGS. 6-8 illustrate a lock nut 51 which is identical to the lock nut 11 in every respect except those specifically set forth below. The lock nut 51 includes a body portion 53 having six rather than four identical generally axially extending locking segments 55 extending axially outwardly from an opening 57 in the body portion 53 and defining an opening extension 59. Each of the segments 55 has an inner surface 61, a pair of radially extending planar lateral surfaces 63, and a flat, planar outer surface 65 extending between and joining the lateral surfaces. The segments 55 are spaced circumferentially to define six generally axially extending slots 66. As six of the segments are provided, each of the inner surfaces 61 has a lesser circumferential dimension than the inner surfaces 27, and therefore, the segments 55 will deflect in a manner which is even more like a flat beam.

The lock nut 51 also differs from the lock nut 11 in that each of the locking segments 55 taper in axial cross section as shown in FIG. 8, Thus, the segments 55 have a progressively decreasing radial dimension as they extend axially outwardly from the body portion 53. The embodiment of FIGS. 6-8 operates in the same manner as described hereinabove with reference to FIGS. 1-5. However, because of the tapered segments 55 and because of the relatively short circumferential direction of the inner surfaces 61, the lock nut 51 could be expected to be reused more times than the lock nut 11 without failure of the locking feature.

FIG. 9 illustrates still another form of lock nut member in the form of a lock nut 71. The lock nut 71 is identical to the lock nut 51 in every respect except as expressly noted herein. The lock nut 71 includes a body portion 73 having a threaded opening 75 extending therethrough and six identical generally axially extending locking segments 77 extending axially outwardly from the opening 75 and forming an extension for such opening. Each of the locking segments 77 has a threaded inner surface 79, a pair of radially extending planar lateral surfaces 81, and a flat planar outer surface 83.

The lock nut 71 differs from the lock nut 51 in that the inner surface 79 of each of the segments 77 are flat except for the presence of a groove 85 which defines the threads on the segments. Stated differently, the inner surfaces 77 are flat intermediate adjacent axially spaced portions of the groove 85 which defines the threads. Thus, as the inner surfaces 79 except for the groove 85 of each of the segments 77 are flat and planar, the segment 77 deflects substantially like a flat beam.

Although exemplary embodiments of the invention have been shown and described, many changes, modifications, and substitutions may be made by one having ordinary skill in the art without necessarily departing from the spirit and scope of this invention.

I claim:

1. A lock nut member for receiving an externally threaded member, said lock nut member comprising:
  a. A substantially nondeflectible body portion having an internal surface defining an opening extending through the body portion, said internal surface of said body portion being internally threaded for receiving the externally threaded member;
  b. a plurality of resilient locking segments joined to said body portion and extending generally axially thereof to define an extension of said opening, said extension of said opening having an axis, said locking segments being spaced circumferentially to define axially extending slots therebetween;
  c. each of said locking segments having an inner surface with screw threads thereon to receive the externally threaded member, said locking segments extending radially inwardly a sufficient amount to allow the locking segments to resiliently grip the externally threaded member and to be deflected radially outwardly thereby;
  d. each of said locking segments having a pair of generally radially extending lateral surfaces with the lateral surfaces of adjacent locking segments being in confronting relationship;
  e. each of said locking segments having a substantially flat outer surface extending between and joining said lateral surfaces, said outer surface being generally perpendicular to a plane at least substantially containing the axis of said extension of said opening and extending through a central region of the locking segment, said flat outer surfaces permitting said locking segments to deflect under the influence of the threaded member in a manner at least approaching the deflection of a flat beam;
  f. said threads on the inner surface of each of said locking segments being defined by grooves on said inner surface and each of said inner surfaces intermediate said grooves therein being generally flat to further cause said locking segments to deflect under the influence of the externally threaded member in a manner still more closely approaching the deflection of a flat beam;
  g. each of said locking segments tapering in axial cross section with each of said locking segments becoming thinner as it extends away from the body member to thereby tend to even out the stress throughout the length of each of the locking segments, said locking segments extending slightly radially inwardly to make the internal diameter of the extension of the opening less than the internal diameter of the opening and each of said locking segments being devoid of abrupt and substantial changes in thickness as viewed in radial or axial cross section, and
  h. said locking segments being of substantial reduced radial thickness relative to the radial thickness of said nondeflectible body portion so as to define a radially extending shoulder between said locking segments and said body portion.

* * * * *